US00RE35392E

United States Patent [19]

Richardson et al.

[11] E Patent Number: Re. 35,392

[45] Reissued Date of Patent: Dec. 10, 1996

[54] GLASS REFRIGERATOR DOOR STRUCTURE

[75] Inventors: Richard J. Richardson, Simi Valley; Bennie R. Downing, Thousand Oaks, both of Calif.

[73] Assignee: Anthony's Manufacturing Company, Inc., San Fernando, Calif.

[21] Appl. No.: 217,491

[22] Filed: Mar. 24, 1994

Related U.S. Patent Documents

Reissue of:

[64] Patent No.: 5,097,642
Issued: Mar. 24, 1992
Appl. No.: 585,602
Filed: Sep. 20, 1990

[51] Int. Cl.[6] ..... E04B 1/74

[52] U.S. Cl. ..... 52/172; 52/745.1; 52/786.13; 52/786.1; 49/501

[58] Field of Search ..... 52/790, 172, 745.1, 52/788; 49/386, 388, 501; 16/308

[56] References Cited

U.S. PATENT DOCUMENTS

| | | |
|---|---|---|
| 834,968 | 11/1906 | Christenson . |
| 1,117,340 | 11/1914 | Crittall . |
| 1,636,593 | 7/1927 | Dennis . |
| 1,805,969 | 5/1931 | Bostrom . |
| 1,877,336 | 9/1932 | Lovell et al. . |
| 1,975,895 | 10/1934 | Geyer . |
| 2,173,649 | 9/1939 | Firner . |
| 2,173,664 | 9/1939 | Shutts . |
| 2,205,522 | 6/1940 | Fix . |
| 2,282,831 | 5/1942 | Shutts . |
| 2,348,307 | 5/1943 | Richardson . |
| 2,383,691 | 8/1945 | Smith . |
| 2,489,962 | 11/1949 | Hardwick . |
| 2,589,064 | 3/1952 | Drake . |
| 2,607,086 | 8/1952 | Saunders . |
| 2,679,074 | 5/1954 | Bryden . |
| 2,708,774 | 5/1955 | Seelen . |
| 2,774,117 | 12/1956 | Eckel . |
| 2,834,999 | 5/1958 | Taylor et al. . |
| 2,872,713 | 2/1959 | Haas . |
| 2,873,486 | 2/1959 | Hughes . |
| 2,877,516 | 3/1959 | Bobel . |
| 2,877,761 | 3/1959 | Schibley . |
| 2,880,475 | 4/1959 | Mills . |
| 2,904,819 | 9/1959 | Seaman . |
| 2,909,814 | 10/1959 | Schwartz . |
| 2,975,492 | 3/1961 | Persson . |
| 2,987,782 | 6/1961 | Kurowski . |
| 3,024,880 | 3/1962 | Burmeister . |

(List continued on next page.)

FOREIGN PATENT DOCUMENTS

| | | |
|---|---|---|
| 0019020 | 11/1980 | European Pat. Off. . |
| 0041840 | 12/1981 | European Pat. Off. . |
| 0082164 | 6/1983 | European Pat. Off. . |
| 0108677 | 6/1984 | European Pat. Off. . |
| 0124749 | 11/1984 | European Pat. Off. . |
| 0124397 | 11/1984 | European Pat. Off. . |
| 0162344 | 11/1984 | European Pat. Off. . |
| 0163166 | 12/1985 | European Pat. Off. . |
| 0168672 | 1/1986 | European Pat. Off. . |
| 0213970 | 3/1987 | European Pat. Off. . |

(List continued on next page.)

*Primary Examiner*—Wynn E. Wood
*Attorney, Agent, or Firm*—Poms, Smith, Lande & Rose

[57] ABSTRACT

A glass refrigerator door structure constructed with two or more glass panels and having a peripheral door frame extending around the sides of the door structure and at the inside of the door without covering the outside glass surface of the door. Sealant is used to bond the glass panels to peripheral spacers separating the panels and to pipe-like structures which extend peripherally around the sides of the door structure. The door frame is connected to the pipe-like structures by a peripheral extension from the frame which engages elongated slots in the pipe-like structures. As such, mechanical fasteners such as nuts, bolts or screws are not needed for the purpose of holding the refrigerator door structure together.

43 Claims, 3 Drawing Sheets

U.S. PATENT DOCUMENTS

| | | | |
|---|---|---|---|
| 3,030,673 | 4/1962 | London . | |
| 3,054,153 | 9/1962 | Partsch . | |
| 3,077,643 | 2/1963 | Horner . | |
| 3,170,456 | 2/1965 | Moss et al. . | |
| 3,280,523 | 10/1966 | Stroud et al. . | |
| 3,300,900 | 1/1967 | Risk et al. . | |
| 3,331,159 | 7/1967 | Cooke et al. . | |
| 3,335,785 | 8/1967 | Anderson . | |
| 3,339,225 | 9/1967 | Booth . | |
| 3,396,490 | 8/1968 | Dukas . | |
| 3,411,247 | 11/1968 | Fleming . | |
| 3,418,779 | 12/1968 | Jendrisak et al. . | |
| 3,425,163 | 2/1969 | Horgan, Jr. . | |
| 3,442,059 | 5/1969 | Kessler . | |
| 3,499,245 | 3/1970 | Winsler et al. . | |
| 3,507,074 | 4/1970 | Gallegos | 49/386 |
| 3,577,973 | 5/1971 | Katona . | |
| 3,629,972 | 12/1971 | Rehberg et al. | 49/386 |
| 3,662,429 | 5/1972 | Johnson et al. . | |
| 3,667,179 | 6/1972 | Eisenberg . | |
| 3,855,995 | 12/1974 | Bentley . | |
| 3,875,706 | 4/1975 | Okawa . | |
| 3,889,434 | 6/1975 | Shelver . | |
| 3,919,023 | 11/1975 | Bowser et al. . | |
| 3,919,821 | 11/1975 | Goetz . | |
| 3,949,526 | 4/1976 | Sherlock et al. . | |
| 3,965,638 | 6/1976 | Newman . | |
| 3,971,178 | 7/1976 | Mazzoni et al. . | |
| 3,975,881 | 8/1976 | Ninowski, Jr. . | |
| 4,015,394 | 4/1977 | Kessler . | |
| 4,030,263 | 6/1977 | Lacombe . | |
| 4,042,736 | 8/1977 | Flint . | |
| 4,043,091 | 8/1977 | Katona . | |
| 4,055,031 | 10/1977 | Okawa et al. . | |
| 4,084,347 | 4/1978 | Brown . | |
| 4,097,320 | 6/1978 | Brauer et al. . | |
| 4,109,432 | 8/1978 | Pilz . | |
| 4,138,284 | 2/1979 | Postupack . | |
| 4,143,493 | 3/1979 | Booi . | |
| 4,145,844 | 3/1979 | Kaspar . | |
| 4,149,348 | 4/1979 | Pyzewski . | |
| 4,155,205 | 3/1979 | Polman . | |
| 4,205,486 | 6/1980 | Guarnacci . | |
| 4,223,482 | 9/1980 | Barroero et al. . | |
| 4,226,063 | 10/1980 | Chenel . | |
| 4,295,305 | 10/1981 | Shelver . | |
| 4,348,435 | 9/1982 | Mistrick et al. . | |
| 4,368,226 | 1/1983 | Mucaria . | |
| 4,382,177 | 5/1983 | Heaney . | |
| 4,393,105 | 7/1983 | Kreisman . | |
| 4,412,708 | 11/1983 | Palka . | |
| 4,416,101 | 11/1983 | Derner et al. . | |
| 4,429,509 | 2/1984 | Vachet et al. . | |
| 4,454,703 | 6/1984 | Sitzler et al. . | |
| 4,459,789 | 7/1984 | Ford . | |
| 4,514,948 | 5/1985 | Meigs et al. . | |
| 4,552,790 | 11/1985 | Francis . | |
| 4,588,235 | 5/1986 | Barroero . | |
| 4,604,840 | 8/1986 | Mondon . | |
| 4,622,249 | 11/1986 | Bowser . | |
| 4,637,167 | 1/1987 | Svensson . | |
| 4,640,078 | 2/1987 | Haffer . | |
| 4,646,472 | 3/1987 | Sugawara | 49/388 |
| 4,658,553 | 4/1987 | Shinagawa . | |
| 4,671,582 | 6/1987 | Stromquist et al. . | |
| 4,691,486 | 9/1987 | Niekrasz et al. . | |
| 4,696,078 | 9/1987 | Stromquist | 16/308 |
| 4,719,728 | 1/1988 | Eriksson et al. . | |
| 4,741,127 | 5/1988 | Bockwinkel . | |
| 4,753,043 | 6/1988 | Bockwinkel . | |
| 4,807,419 | 2/1989 | Hodek et al. . | |
| 4,817,335 | 4/1989 | Adell . | |
| 4,818,043 | 4/1989 | Borgen . | |
| 4,822,649 | 4/1989 | Canaud et al. . | |
| 4,825,609 | 5/1989 | Rundo . | |
| 4,831,780 | 5/1989 | Bockwinkel . | |
| 4,852,303 | 8/1989 | Rolek . | |
| 4,873,803 | 10/1989 | Rundo . | |
| 4,890,438 | 1/1990 | Tosa et al. . | |
| 4,905,347 | 3/1990 | Worth | 16/308 |
| 4,940,297 | 7/1990 | Borgen . | |
| 4,948,206 | 8/1990 | Fitzpatrick . | |
| 4,950,344 | 8/1990 | Glover et al. . | |
| 4,961,975 | 10/1990 | Bejnar . | |
| 4,994,309 | 2/1991 | Reichert et al. . | |
| 4,998,382 | 3/1991 | Kostos et al. . | |
| 5,024,023 | 6/1991 | Kostos et al. . | |
| 5,113,628 | 5/1992 | Richardson et al. | 52/790 |
| 5,228,240 | 8/1993 | Barrdero et al. | 16/308 |

FOREIGN PATENT DOCUMENTS

| | | | |
|---|---|---|---|
| 0231676 | 8/1987 | European Pat. Off. . | |
| 0249299 | 12/1987 | European Pat. Off. . | |
| 0264002 | 4/1988 | European Pat. Off. . | |
| 0264052 | 4/1988 | European Pat. Off. . | |
| 0269470 | 6/1988 | European Pat. Off. . | |
| 0288060 | 10/1988 | European Pat. Off. . | |
| 0303330 | 2/1989 | European Pat. Off. . | |
| 0313892 | 5/1989 | European Pat. Off. . | |
| 0319695 | 6/1989 | European Pat. Off. . | |
| 0351573 | 1/1990 | European Pat. Off. . | |
| 0388550 | 9/1990 | European Pat. Off. . | |
| 0387204 | 9/1990 | European Pat. Off. . | |
| 0418461 | 3/1991 | European Pat. Off. . | |
| 0432872 | 7/1991 | European Pat. Off. . | |
| 2840656 | 3/1980 | Germany . | |
| 0176091 | 4/1986 | Germany . | |
| 3543524 | 6/1987 | Germany . | |
| 1032616 | 4/1979 | Italy . | |
| 1084120 | 5/1985 | Italy . | |
| 1091235 | 7/1985 | Italy . | |
| 1165175 | 4/1987 | Italy . | |
| 1208888 | 7/1989 | Italy . | |
| 1216012 | 2/1990 | Italy . | |
| 7604769 | 3/1977 | Sweden . | |
| 0138782 | 8/1984 | Sweden | 49/386 |
| 503878 | 2/1971 | Switzerland . | |
| 1301651 | 1/1973 | United Kingdom . | |
| 1398434 | 6/1975 | United Kingdom . | |
| 1482372 | 8/1977 | United Kingdom . | |
| 2023209 | 12/1979 | United Kingdom . | |
| 1579838 | 11/1980 | United Kingdom . | |
| 2075435 | 11/1981 | United Kingdom . | |
| 1581946 | 12/1990 | United Kingdom . | |
| 8400191 | 1/1984 | WIPO . | |

Fig. 4.
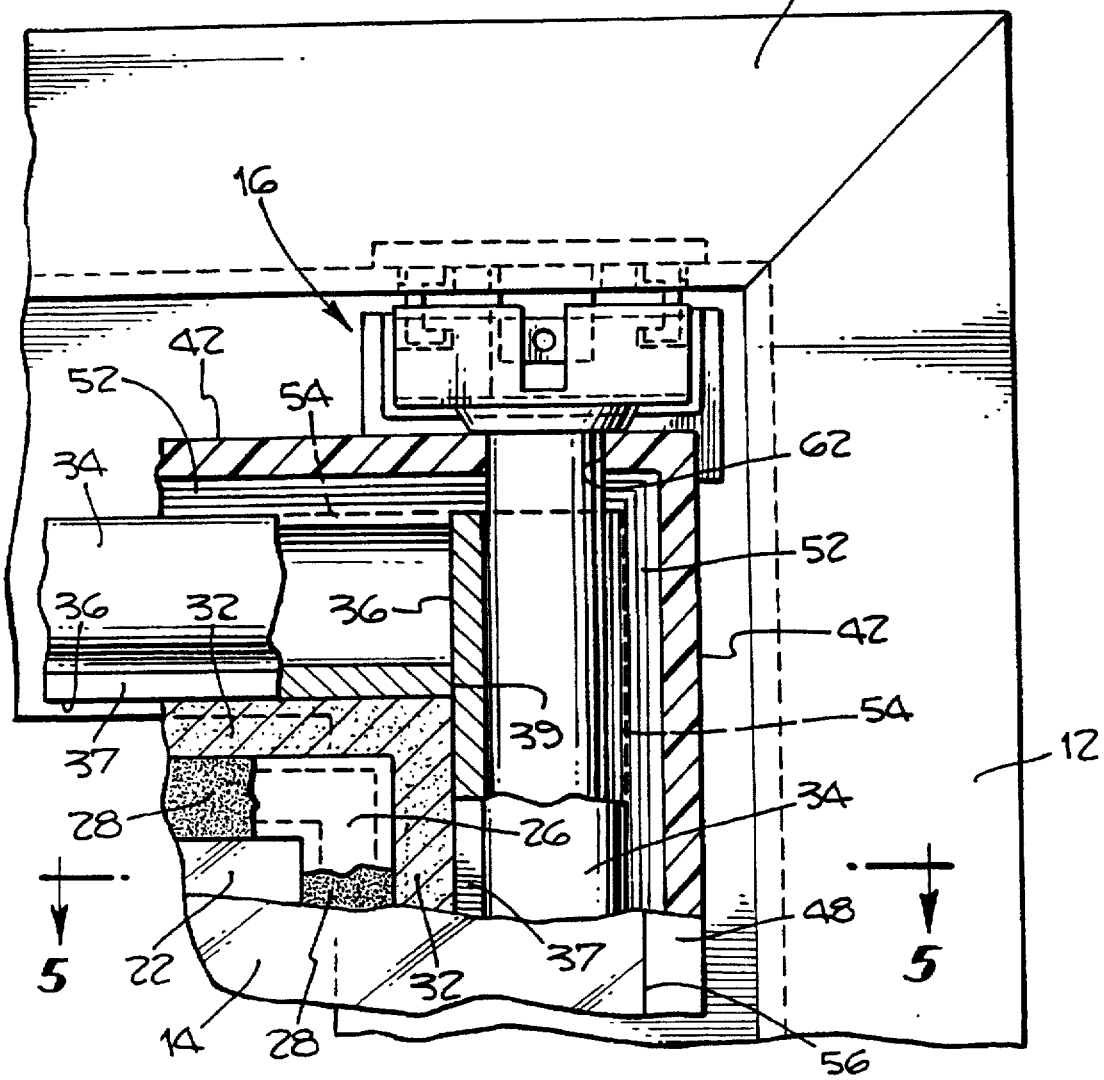
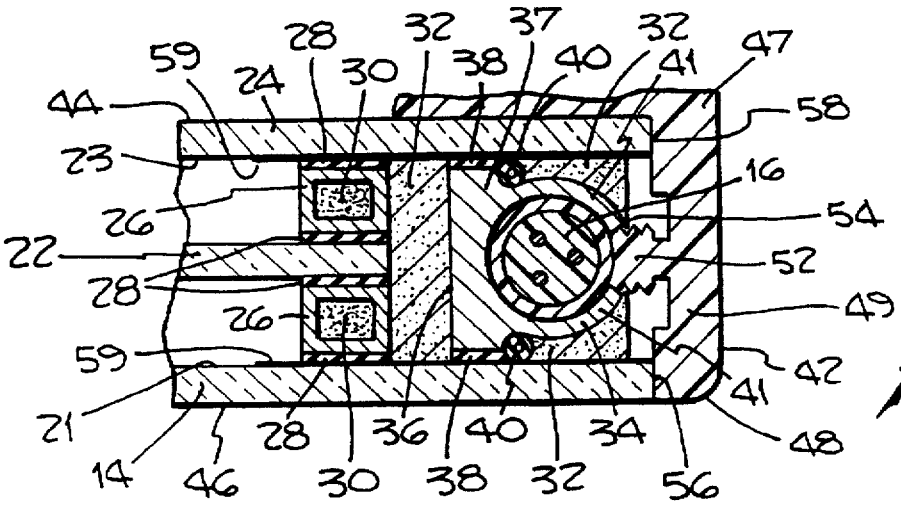
Fig. 5.

GLASS REFRIGERATOR DOOR STRUCTURE

Matter enclosed in heavy brackets [ ] appears in the original patent but forms no part of this reissue specification; matter printed in italics indicates the additions made by reissue.

BACKGROUND OF THE INVENTION:

The present invention relates generally to refrigerator doors, and more particularly to a glass refrigerator door structure constructed with two or more glass panels and having a peripheral door frame extending around the sides of the door structure and at the inside of the door without covering the outside glass surface of the door.

Present commercial glass refrigerator doors typically have door frames which extend peripherally around the glass panels of the doors. Such door frames are used to hold the glass panels in place and extend peripherally around both the inside and outside glass surfaces of the doors. As a result, the door frames can be seen from the outside of the doors, detracting from the appearance of the glass doors. Such door frames are disclosed, for example in U.S. Pat. Nos.

4,696,078, issued to Stromquist on Sept. 29, 1987; 4,671,582, issued to Stromquist, et al. on June 9, 1987; 4,223,482, issued to Barroero, et al. on Sept. 23, 1980; 3,339,225, issued to Booth on Sept. 5, 1967; and 3,331,159, issued to Cooke, et al. on July 18, 1967.

SUMMARY OF THE INVENTION:

It is an object of this invention to provide a glass refrigerator door structure having a peripheral door frame that does not cover the outside glass surface of the door, presenting a more attractive and desirable refrigerator door.

It is another object of this invention to provide a glass refrigerator door structure that is simple in design and inexpensive to manufacture.

It is still another object of this invention to provide a glass refrigerator door structure which may be constructed with two or more glass panels.

It is still another object of this invention to provide a glass refrigerator door structure which does not require mechanical fasteners such as nuts, bolts or screws to hold the structure together or to hold a peripheral door frame to glass panels of the door structure.

These and other objects and advantages are attained by a glass refrigerator door structure constructed with two or more glass panels. The refrigerator door structure has a peripheral door frame extending around the sides of the door structure and at the inside of the door without covering the outside glass surface of the door. Sealant is used to bond the glass panels to peripheral spacers separating the panels and to pipe-like structures which extend peripherally around the sides of the door structure. The door frame is connected to the pipe-like structures by a peripheral extension from the frame which engages elongated slots in the pipe-like structures. As such, mechanical fasteners such as nuts, bolts or screws are not needed for the purpose of holding the refrigerator door structure together.

The various features of the present invention will be best understood together with further objects and advantages by reference to the following description of the preferred embodiments taken in conjunction with the accompanying drawings.

BRIEF DESCRIPTION OF THE DRAWINGS:

FIG. 4 is a detailed cross-sectional view taken in the direction of arrows 4—4 shown in FIG. 2;

FIG. 5 is a detailed cross-sectional view taken in the direction of arrows 5—5 shown in FIG. 4 illustrating how three glass may be used for the glass refrigerator door structure;

DESCRIPTION OF THE PREFERRED EMBODIMENTS:

The following specification taken in conjunction with the drawings sets forth the preferred embodiments of the present invention in such a manner that any person skilled in the art can make and use the invention. The embodiments of the invention disclosed herein are the best modes contemplated by the inventors for carrying out their invention in a commercial environment, although it should be understood that various modifications can be accomplished within the parameters of the present invention.

Figure 1:
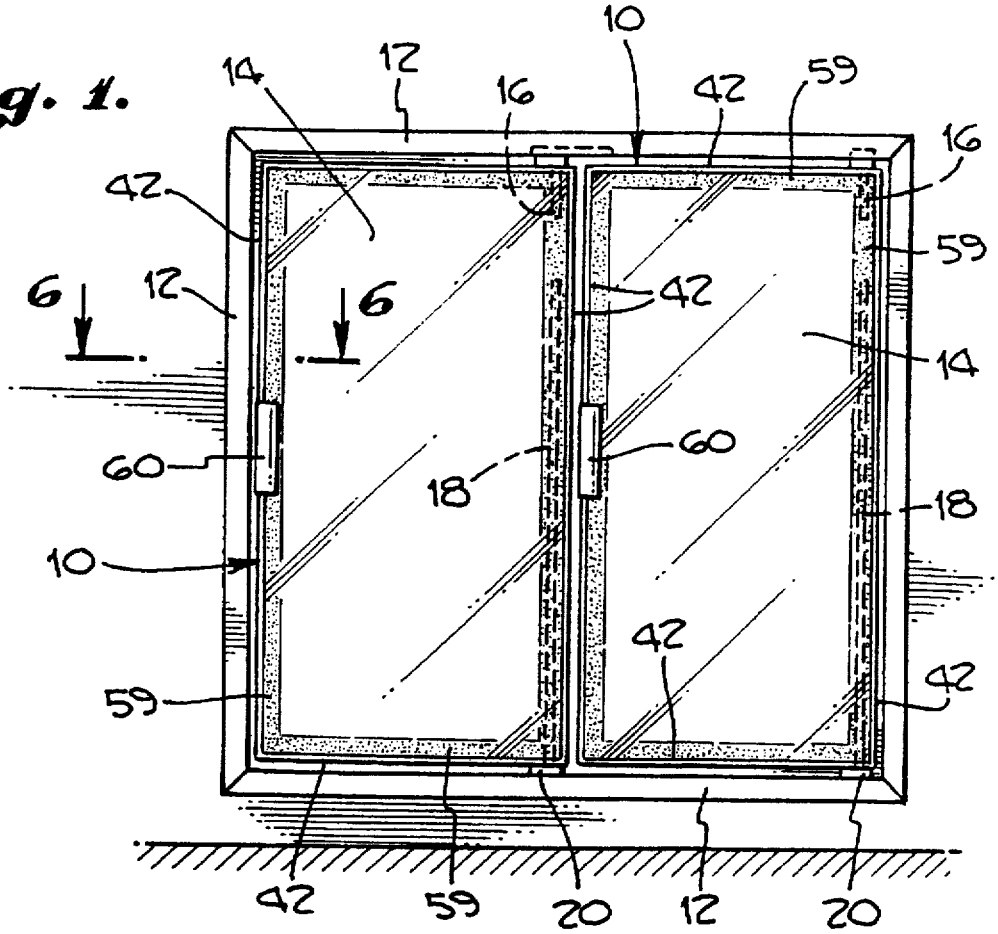
FIG. 1 is an elevational view of two glass refrigerator door structures of the present invention mounted on a cabinet or other supporting structure.

Referring to FIG. 1, two glass refrigerator door structures 10 of the present invention are shown installed or mounted on a cabinet or other supporting structure 12. The refrigerator door structures 10 have glass panels 14 which allow someone, such as a customer in a supermarket, to look through the panels 14 at frozen foods or other items kept inside a refrigerated area. However, it is important to note that the door structure 10 of the present invention may be used as doors for any enclosed area whether or not the area is refrigerated.

A door hinge assembly 16 may be used at the upper right-hand corner of each glass refrigerated door structure 10 and a torque rod 18 may be mounted in an adjustable anchor device 20 attached to the supporting structure 12 near the lower right-hand corner of the door structure 10.

Figure 2:
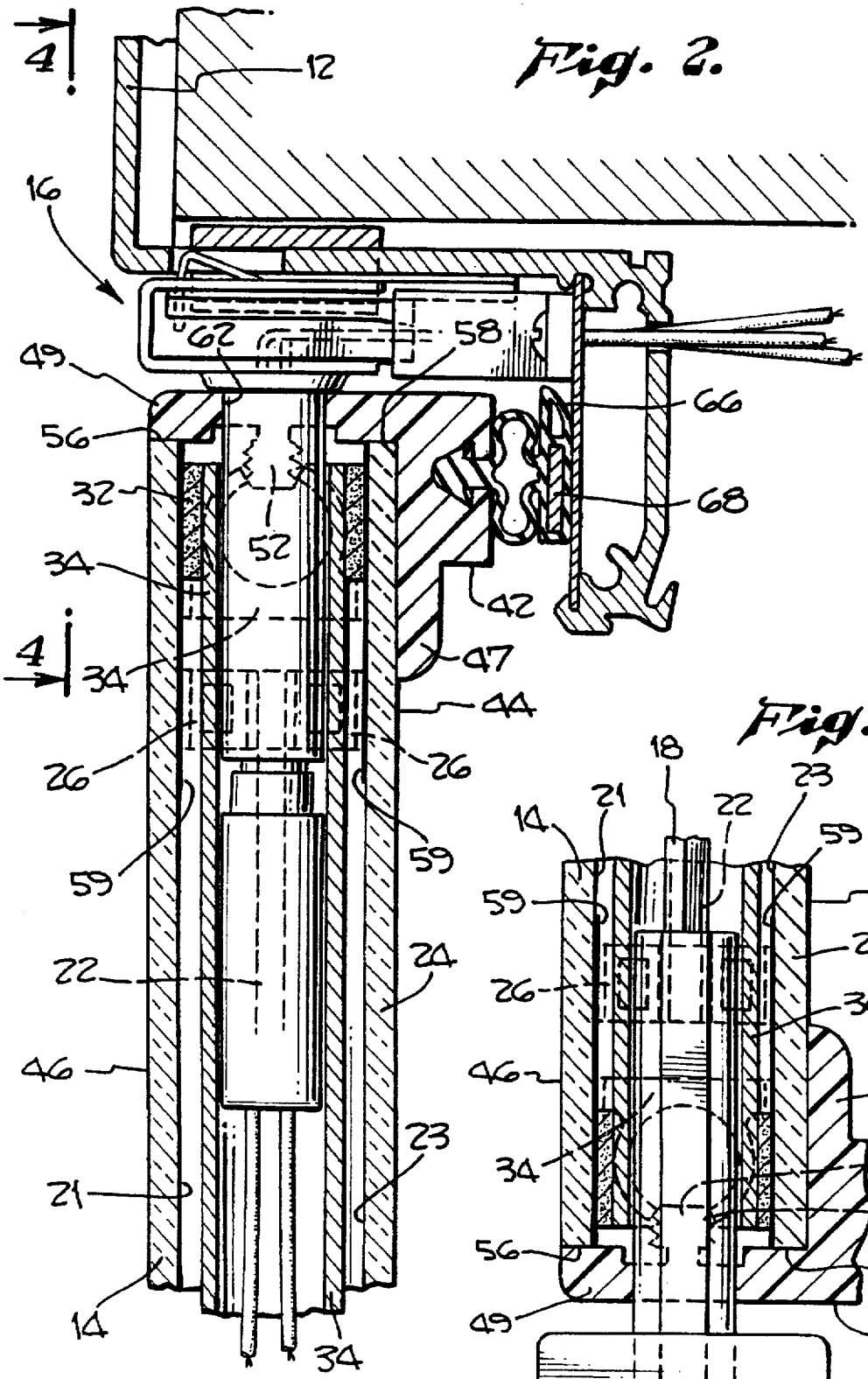
FIG. 2 is a detailed cross-sectional view showing how a door hinge may be used at the upper right-hand corner of each glass refrigerator door structure.

One such door hinge assembly 16 is shown in detail in FIGS. 2 and 4. This hinge assembly 16 is described in U.S. Pat. No. 4,671,582, issued to Stromquist, et al. on June 9, 1987, the disclosure of which is hereby incorporated by reference thereto. However, any other suitable type of hinge assembly may be used instead of the hinge assembly 16 shown in FIGS. 2 and 4.

Figure 3:
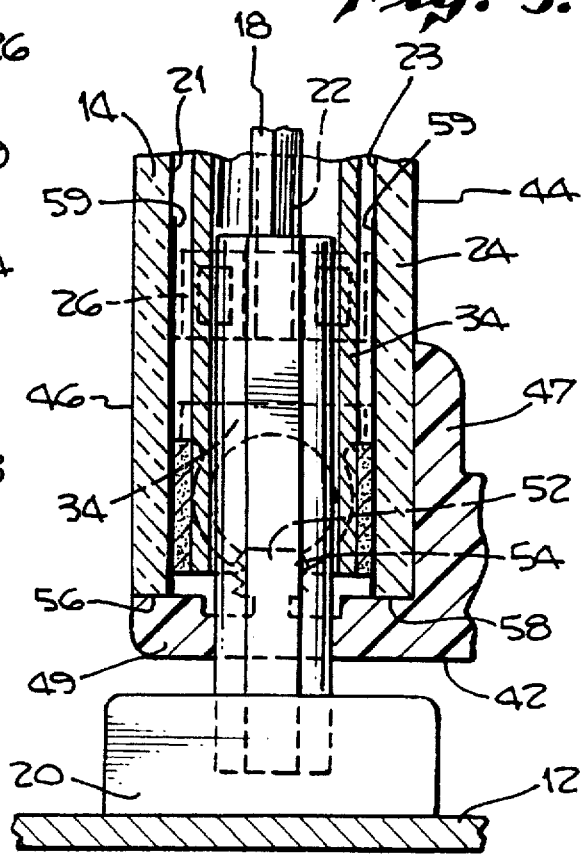
FIG. 3 is a detailed cross-sectional view showing how a torque rod may be used with an adjustable anchor device at the lower right-hand corner of each glass refrigerator door structure.

FIG. 3 shows how the torque rod 18 may be mounted in an adjustable anchor device 20 at the lower right-hand corner of each refrigerator door structure 10. A torque rod 18 and an adjustable anchor device 20, which may be used with door structure 10, are described in U.S. Pat. No. 4,696,078, issued to Stromquist on Sept. 29, 1987, the disclosure of which is hereby incorporated by reference thereto. It is important to note that any other suitable types of torque rods or anchor devices may also be used. For example, the torque rod 18 may be mounted in an aperture in the supporting structure 12.

Referring now to FIGS. 4 and 5, an embodiment of the glass refrigerator door structure 10 is shown which uses outside, middle and inside glass panels 14, 22 and 24, respectively. The panels are spaced apart by two hollow spacers 26, preferably made of metal such as aluminum. However, any desirable material may be used for the spacers 26. Each hollow spacer 26 forms a rectangular shaped frame-line structure as shown in FIG. 4 and extends around the sides of the door structure 10. As shown in FIG. 5, the hollow spacers 26 are preferably filled with desiccant 30 used as a drying agent. Any suitable material may be used as desiccant 30. Rubber or neoprene insulators 28 are used between the spacers 26 and the glass panels 14, 22 and 24 as shown in FIG. 5.

Four hollow pipe-like structures 34 are located between glass panels 14 and 24 as shown in FIG. 5, each of which extends along a different side of the refrigerator door structure 10. See FIG. 4, which shows how one pipe-like structure 34 extends across the top side of the door structure 10 while another pipe-like structure 34 extends along the right side of the structure 10. Similarly, separate structures 34 extend along the left side and bottom side of the door structure 10. The structures 34 are preferably made out of aluminum, but any suitable material may be used.

Referring again to FIG. 5, each pipe-like structure 34 has a flat portion 36 and flanged ends 37. Rubber or neoprene [insulators] *resilient insulating members* 38 are used between flanges 37 of each pipe-like structure 34 and glass panels 14 and 24 as shown in FIG. 5. Note how end 39 of horizontal pipe-like structure 34 in FIG. 4 abuts up against flat portion 36 of vertical pipe-like structure 34. *The pipe-like structure also includes a pair of members 41 which converge toward another and define a rod receiving opening therebetween.*

As shown in FIGS. 4 and 5, sealant 32 is placed in the void space between the pipe-like structures 34 and the hollow spacers 26, and between each pipe-like structure 34 and glass panels 14 and 24. Sealant 32 bonds to structures 34, spacers 26, and glass panels 14, 22 and 24, positioning or holding panels 14, 22 and 24 in place. The preferred sealant 32 is polysulfide or polyurethane. However, any suitable thermal setting sealant may be used that hardens and bonds as described above.

The glass refrigerator door structure 10 has a peripheral door frame 42 extending around the sides of the door structure 10. As such, frame 42 forms a generally rectangular-shaped frame. As shown in FIGS. 2, 3 and 5, frame 42 is in contact with or covers inside surface 44 of glass panel 24, but does not cover outside surface 46 of glass panel 14. As such, a more attractive or desirable glass refrigerator door structure 10 results because only a small outside surface 48 of frame 42 appears at the front or outside of door structure 10, or along the sides of structure 10. Note that the small outside surface of frame 42 may be curved if desired like surface 50 shown in FIG. 7.

Door frame 42 has a generally V-shaped cross-section with inside portion 47 and side portion 49. Portion 49 has a peripheral extension 52 extending peripherally around frame 42 which engages or snaps into elongated slots or openings 54 in the pipe-like structures 34 so that glass panels 14 and 24 are positioned with respect to frame 42 with peripheral edges 56 and 58 of panels 14 and 24, respectively, abutting up against portion 49 as shown in FIG. 5. As such, the glass refrigerator door structure 10 is, or frame 42 is held to panels 14 and 24, such as nuts, bolts or screws.

Figure 6:
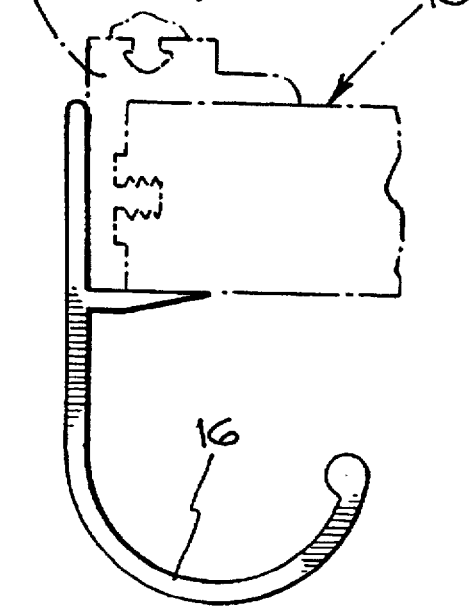
FIG. 6 is a detailed view taken in the direction of arrows 6—6 shown in FIG. 1 illustrating how a handle is attached to of the glass refrigerator door structures (shown by lines)

A handle 60 may be attached to the refrigerator door structure 10 as shown in FIG. 6. In addition, as shown in FIGS. 2 through 4, door frame 42 has an aperture 62 at the upper right-hand corner thereof for hinge assembly 16, and an aperture 64 at the lower right-hand corner thereof for torque rod 18. It is important to note that handle 60 and apertures 62 and 64 may be positioned as desired to provide either a left- or right-hand door.

Referring again to FIG. 2, a door seal 66 with magnet 68 may be attached to the door frame 42 for the purpose of keeping the door structure 10 shut. As shown in FIG. 5, wires 40 may be positioned next to the pipe-like structures 34 and hold in place by sealant 32. Wires 40 may be heating wires.

Figure 7:
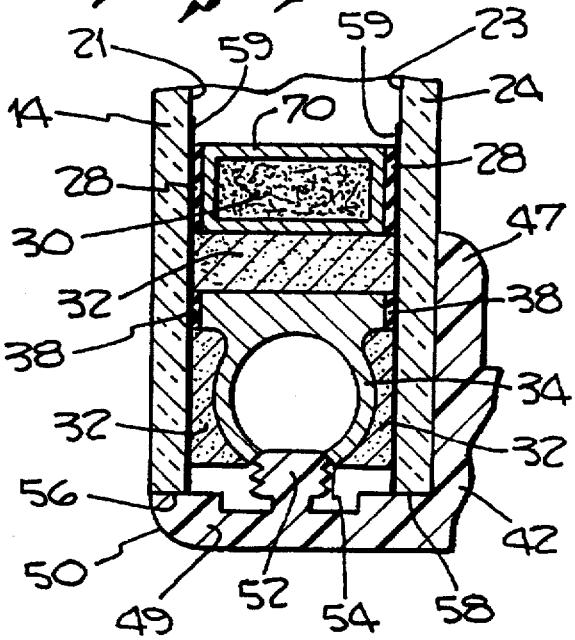
FIG. 7 is a detailed cross-sectional view taken like FIG. 5 showing another embodiment of the glass refrigerator door structure using two glass panels.

Another embodiment of the glass refrigerator door structure 10 is shown in FIG. 7. This embodiment uses only two glass panels 14 and 24 and a single peripheral hollow spacer 70 filled with desiccant 30. Note that sealant 32 is used to bond together panels 14 and 24, spacer 70 and pipe-like structures 34.

Preferably, as shown in FIGS. 1, 3, 5 and 7, borders 59 are painted (or otherwise coated) peripherally adjacent the edges 56 and 58 of glass panels 14 and 24 on surfaces 21 and 23, respectively. The painted borders 59 conceal from view structures 34 and spacers 26 or 70, providing a more attractive door structure 10.

The above description discloses the preferred embodiments of the present invention. However, persons of ordinary skill in the art are capable of numerous modifications once taught these principles. Accordingly, it will be understood by those skilled in the art that changes in form and details may be made to the above-described embodiments without departing from the spirit and scope of the invention.

We claim:

1. A refrigerator door structure comprising:

an outside glass panel and an inside glass panel;

a spacer disposed between said glass panels, said spacer extending peripherally adjacent peripheral edges of said panels;

elongated structures disposed between said glass panels, said elongated structures extending peripherally adjacent said peripheral edges of said panels and peripherally about an outer periphery of said spacer;

sealant disposed between said panels, said sealant holding together said panels, said spacer and said elongated structures; and a door frame extending peripherally about said elongated structures, said door frame being directly engaged to said elongated structures.

2. A refrigerator door structure comprising:

an outside glass panel and an inside glass panel;

a hollow spacer disposed between said glass panels, said spacer extending peripherally adjacent peripheral edges of said panels;

pipe-like structures disposed between said glass panels, said pipe-like structures extending peripherally adjacent said peripheral edges of said panels;

sealant disposed between said panels, said sealant holding together said panels, said spacer and said pipe-like structures; and a door frame extending peripherally about said pipe-like structures, said door frame being engaged to said pipe-like structures, said pipe-like structures having elongated slots therein, and said door frame having a peripheral extension engaging said elongated slots.

3. The refrigerator door structure of claim 1 wherein said door frame [about] *abuts* said peripheral edges of said panels and covers a peripheral inside surface of said inside panel.

4. The refrigerator door structure of claim 1 wherein said spacer is filled with a desiccant.

5. The refrigerator door structure of claim 1 further comprising rubber insulators disposed between said spacer and said panels and between said structures and said panels.

6. The refrigerator door structure of claim 1 wherein said sealant is a thermal setting sealant.

7. A refrigerator door structure comprising:

an outside glass panel and an inside glass panel;

a hollow spacer disposed between said glass panels, said spacer extending peripheral adjacent peripheral edges of said panels;

pipe-like structures disposed between said glass panels, said pipe-like structures extending peripherally adjacent said peripheral edges of said panels;

sealant disposed between said panels, said sealant holding together said panels, said spacer and said pipe-like structures;

a door frame extending peripherally about said pipe-like structures, said door frame being engaged to said pipe-like structures; and wires disposed in said sealant said pipe-like structures.

8. A refrigerator door structure comprising:

an outside glass panel, a middle glass panel and an inside glass panel;

a spacer disposed between said outside and middle glass panels;

a spacer disposed between said middle and inside glass panels;

elongated structures disposed between said inside and outside panels and extending peripherally adjacent peripheral edges of said inside and outside panels and peripherally about outer peripheries of said spacers;

sealant disposed between said inside and outside panels, said sealant holding together said spacers, said elongated structures and said inside, middle and *outside panels; and*

*a door frame extending peripherally about said peripheral edges of said inside and outside panels without covering an outside surface of said* outside panel, said door frame being directly engaged to said structures.

9. A refrigerator door structures comprising:

an outside glass panel, a middle glass panel and an inside glass panel;

a hollow spacer disposed between said outside and middle glass panels;

a hollow spacer disposed between said middle and inside glass panels;

structures disposed between said inside and outside panels and extending peripherally adjacent peripheral edges of said inside and outside panels;

sealant disposed between said inside and outside panels, said sealant holding together said spacers, said structures and said inside, middle and outside panels; and a door frame extending peripherally about said structures, said door frame being engaged to said structures, said structures having elongated slots therein, said door frame having a peripheral extension engaging said elongated slots.

10. The refrigerator door structure of claim 8 wherein said door frame abuts said peripheral edges of said inside and outside panels and covers a peripheral inside surface of said inside panel.

11. The refrigerator door structure of claim 8 wherein said spacers are filled with a desiccant.

12. The refrigerator door structure of claim 8 further comprising rubber insulators disposed between said spacers and said panels and between said structures and said inside and outside panels.

13. The refrigerator door structure of claim 8 wherein said sealant is a thermal setting sealant.

14. A refrigerator door structure comprising:

an outside glass panel, a middle glass panel and an inside glass panel;

a hollow spacer disposed between said outside and middle glass panels;

a hollow spacer disposed between said middle and inside glass panels;

structures disposed between said inside and outside panels and extending peripherally adjacent peripheral edges of said inside and outside panels;

sealant disposed between said inside and outside panels, said sealant holding together said spacers, said structures and said inside, middle and outside panels;

a door frame extending peripherally about said structures, said door frame being engaged to said structures; and wires disposed in said sealant adjacent said structures.

15. A refrigerator door structure comprising:

an outside glass panel and an inside glass panel;

a hollow spacer disposed between said glass panels, said spacer extending peripheral adjacent peripheral edges of said panels;

pipe-like structures disposed between said glass panels, each of said pipe-like structures having elongated slots therein and being disposed adjacent one of said peripheral edges of said panels;

sealant disposed between said panels, said sealant holding together said panels, spacer and pipe-like structures; and a door frame extending peripherally about said peripheral *edges of said panels, said door frame having a peripheral* extension engaging said elongated slots.

16. The refrigerator door structure of claim 15 wherein said door frame abuts said peripheral edges of said panels and covers a peripheral inside surface of said inside panel.

17. The refrigerator door structure of claim 15 wherein said hollow spacer is filled with a desiccant.

18. The refrigerator door structure of claim 15 further comprising rubber insulators disposed between said spacer and said panels and between said pipe-like structures and said panels.

19. The refrigerator door structure of claim 15 wherein said sealant is a thermal setting sealant.

20. The refrigerator door structure of claim 15 wherein said panels have painted peripheral borders extending peripherally around said panels adjacent said peripheral edges of said panels.

*21. A swing door assembly, comprising:*

*first and second door panels spaced apart by a first distance in a first direction substantially perpendicular to at least one of said door panels to provide a space therebetween, said panels having panel edges;*

*a structural member positioned between said panels proximate said edges, said structural member defining a maximum cross-sectional dimension, said maximum cross-sectional dimension being substantially less than said first distance; and*

*swinging means for mounting said panels for swinging movement.*

*22. The assembly of claim 21 wherein said structural member defines a rod receiving opening and said swinging means includes a torque rod received in said opening.*

*23. The assembly of claim 21 wherein said structural member includes side portions, each side portion facing a respective panel, and portions which converge toward one another.*

*24. The assembly of claim 21 further comprising at least one spacer disposed substantially adjacent to said structural member and between said panels so as to space said panels apart.*

*25. The assembly of claim 21 wherein said structural member defines a rod receiving opening.*

*26. The assembly of claim 21 further comprising sealant between said panels.*

*27. The assembly of claim 21 further comprising a third panel disposed between said first and second panels, a first spacer spacing said first and third panels apart, and a second spacer spacing said second and third panels apart.*

*28. The assembly of claim 21 further comprising a door frame with a portion positioned at said panel edges, said door frame having a peripheral extension which secures said door frame to said door.*

*29. The assembly of claim 28 wherein said structural member has a slot and said extension extends into said slot.*

*30. The assembly of claim 21 further comprising sealant between said structural member and one of said first and second panels.*

*31. A door assembly for use as a swing door, the assembly comprising:*

*at least two door panels having edges and being spaced apart a distance to provide a space between the panels;*

*a structural member positioned at least partly between the panels near the respective edges of at least one side of the panels, the structural member having a longitudinal axis;*

*resilient members between the structural member and the panels such that the structural member extends less than the entire distance of the space between the panels;*

*the structural member having side portions, each facing a respective adjacent panel, to which the resilient members are attached, and portions which converge toward one another and away from the respective panels such that twisting of the structural member between the panels about its longitudinal axis would not result in the structural member contacting the panels; and*

*at least one swing element positioned coaxially with respect to the structural member so as to permit swinging movement of the door.*

*32. The assembly of claim 31 wherein the portions which converge toward one another have a distance and the side portions have a width and wherein the distance of the portions which converge toward one another is longer than the width of the side portions so that the side portions form a relatively small part of the width of the structural member.*

*33. The assembly of claim 32 wherein the resilient members have a low thermal conductivity.*

*34. The assembly of claim 33 wherein the resilient members are neoprene.*

*35. The assembly of claim 33 wherein the resilient members are rubber.*

*36. The assembly of claim 31 wherein the structural member has a maximum cross-sectional dimension and the dimension is less than the distance between the panels.*

*37. The assembly of claim 31 further comprising sealant between the panels and the structural member.*

*38. The assembly of claim 31 wherein one portion of said sealant is between said first panel and said structural member and another portion of said sealant is between said second panel and said structural member.*

*39. The assembly of claim 31 further comprising a closure mechanism extending coaxially with the structural member.*

*40. The assembly of claim 31 further comprising a spacer to space the panels apart.*

*41. A refrigerator display door comprising:*

*an outside glass panel and an inside glass panel;*

*a hollow spacer disposed between said glass panels for maintaining the glass panels in spaced apart relation;*

*structural members disposed between the glass panels;*

*resilient members between the structural members and the panels, the resilient members being insulators to reduce heat transfer between said panels;*

*a door frame extending around the peripheral edges of the glass panels, said door frame being directly engaged to the structural members;*

*at least one hinge engaging at least one of the structural members for allowing the display door to swing; and*

*a flexible sealant disposed between the panels and between the panels and the structural members, said flexible sealant holding the panels, the spacers, and the structural members together.*

*42. The display door of claim 41 wherein the door frame engages the peripheral edges of the glass panels and covers an exposed surface of the inside glass panel.*

*43. The display door of claim 42 further comprising neoprene insulators disposed between the spacers and the respective glass panels.*

* * * * *